US 6,690,126 B2

(12) United States Patent
Lee et al.

(10) Patent No.: US 6,690,126 B2
(45) Date of Patent: Feb. 10, 2004

(54) POWER SUPPLYING APPARATUS FOR ELECTRON GUN IN CDT

(75) Inventors: Sang-Young Lee, Kyungki-do (KR); Joong-Yeol Kwon, Suwon (KR); Jung-Hyun Ahn, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/983,073

(22) Filed: Oct. 23, 2001

(65) Prior Publication Data
US 2002/0163310 A1 Nov. 7, 2002

(30) Foreign Application Priority Data
May 4, 2001 (KR) .................................. 2001-24453

(51) Int. Cl.[7] .............................. H01J 29/70; G09G 1/04
(52) U.S. Cl. ........................ 315/411; 315/328; 315/408
(58) Field of Search ............................... 315/372, 382, 315/408, 411, 367, 379, 399

(56) References Cited

U.S. PATENT DOCUMENTS

| 3,495,426 A | | 2/1970 | Dietz | 315/382.1 |
| 3,883,780 A | | 5/1975 | Tsukada | 315/408 |
| 5,587,893 A | * | 12/1996 | Teng | 363/61 |
| 5,602,447 A | * | 2/1997 | Smith | 315/411 |
| 5,982,641 A | * | 11/1999 | Jackson | 363/21 |
| 6,198,237 B1 | * | 3/2001 | Choi | 315/411 |

FOREIGN PATENT DOCUMENTS

| EP | 696 049 | 4/1998 | ............ H01J/29/50 |
| EP | 0851671 | 7/1998 | ............ H04N/3/185 |
| JP | 11-284875 | 10/1999 | ............ H04N/3/18 |
| JP | 2000-231355 | 8/2000 | ............ G09G/1/00 |
| JP | 2000-350051 | 12/2000 | ............ H04N/3/18 |
| KR | 1989-009174 | 7/1989 | ............ H04N/3/26 |
| KR | 1997-077033 | 12/1997 | ............ H01J/29/48 |
| KR | 1998-062235 | 11/1998 | ............ H01F/38/42 |
| KR | 1998-082271 | 12/1998 | ............ H01F/38/42 |

OTHER PUBLICATIONS

"Communication search report" issued by European Patent Office dated on Sep. 13, 2002.

* cited by examiner

Primary Examiner—Hoang Nguyen
(74) Attorney, Agent, or Firm—Robert E. Bushnell, Esq.

(57) ABSTRACT

Disclosed is a power-supplying apparatus for an electron gun in a color display tube (CDT) provided with an fly back transformer (FBT) having a focus voltage output terminal and an acceleration voltage output terminal, further having a power supplying part supplying a predetermined reference voltage; a focus voltage detection part detecting a focus voltage of the focus voltage output terminal; and a focus voltage boost part boosting the focus voltage of the focus voltage output terminal in case that the focus voltage detected by the focus voltage detection part is lower than the reference voltage of the power supplying part. With this configuration, it is possible to recover the voltage of the focus voltage output terminal dropped according to the grid discharging of the electron gun in the color display tube to the normal voltage.

20 Claims, 4 Drawing Sheets

EC3-S  EC2                    EC3-D
  3     5                       7

POWER SUPPLYING APPARATUS FOR ELECTRON GUN IN CDT

CLAIM OF PRIORITY

This application makes reference to, incorporates the same herein, and claims all benefits accruing under 35 U.S.C. §119 from my application POWER SUPPLYING DEVICE FOR ELECTRON GUN IN CDT filed with the Korean Industrial Property Office on May 4, 2001 and there duly assigned Ser. No. 24453/2001.

BACKGROUND OF THE INVENTION

1. Technical Field

The present invention relates in general to a power-supplying apparatus for an electron gun in a color display tube (CDT) and, more particularly, to a power-supplying apparatus for an electron gun in a color display tube, which is provided with a fly back transformer (FBT) including an acceleration voltage output terminal and a focus voltage output terminal being connected to an acceleration grid and a focus grid, respectively.

2. Description of the Related Art

A color display tube (CDT) is a picture display apparatus allowing a cathode-ray tube to emit an electron beam according to video signal from a signal source, and allowing a fluorescent substance on a fluorescent panel to emit light by collision with the emitted electron beam, thereby displaying a picture on the panel.

Generally, the color display tube reproduces a predetermined color picture on the fluorescent picture by collision with the electron beam emitted from three electron guns, passing through a shadow mask after acceleration by high voltage (HV+).

With reference to power supplying devices for electron guns, we have detected that a voltage of an acceleration voltage output terminal can fluctuate in an unstable manner depending upon a voltage change of focus voltage output terminals. Accordingly, a screen can become dim, or an iridescent phenomenon may appear on the screen.

SUMMARY OF THE INVENTION

Accordingly, the present invention has been made keeping in mind the above-described shortcomings and user's need, and an object of the present invention is to provide a power supplying apparatus for an electron gun in a color display tube, which can recover voltage of a focus voltage output terminals in fly back transformer dropped by a discharge in the electron gun into normal voltage.

These objects and other objects of the present invention may be accomplished by the provision of a power-supplying apparatus for an electron gun in a color display tube provided with an fly back transformer comprising a focus voltage output terminal and an acceleration voltage output terminal, further comprising a power supplying part supplying a predetermined reference voltage; a focus voltage detection part detecting a focus voltage of the focus voltage output terminal; a focus voltage boost part boosting the focus voltage of the focus voltage output terminal in case that the focus voltage detected by the focus voltage detection part is lower than the reference voltage of the power supplying part.

Here, the focus voltage detection part includes a detection resistance connected in series to the focus voltage output terminal, and can easily detect the focus voltage. The focus voltage boost part comprises a voltage boost circuit provided with a resistance and a capacitor between the power supplying part and the focus voltage detection part, charging therein the reference voltage from the power supplying part, to thereby recover loss of the focus voltage.

Desirably, the power supplying part comprises a vertical and dynamic waveform power-supplying part of the fly back transformer. The focus voltage boost part includes a diode cutting off an inverse electric current from the focus voltage detection part to the power supplying part.

To the acceleration voltage output terminal is provided a by-pass capacitor for maintaining an acceleration voltage, and the voltage of the acceleration voltage output terminal is prevented from fluctuating due to the voltage change of the focus voltage output terminals.

According to another aspect of the present invention, the above objects and other objects may be also achieved by the provision of a method for recover a normal focus voltage of an electron gun in a color display tube, comprising the steps of detecting a focus voltage applied to a focus grid of the electron gun; comparing the focus voltage with a predetermined reference voltage; and boosting the focus voltage applied to the focus grid in case that the focus voltage is lower than the reference voltage.

The reference voltage is voltage of a vertical and dynamic waveform power-supplying terminal applied to the focus grid. The step of boosting the focus voltage comprises the step of supplying voltage charged by a capacitor and a resistance between the focus grid and the vertical and dynamic waveform power-supplying terminal to the focus grid, thereby effectively boosting the focus voltage.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions or constructions are not described in detail since they would obscure the invention in unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

In the electron gun are provided a control grid controlling the emitted electron beam, an acceleration grid accelerating the electron beam controlled by the control grid, a focus grid focusing the electron beam, and other components.

Figure 1A:
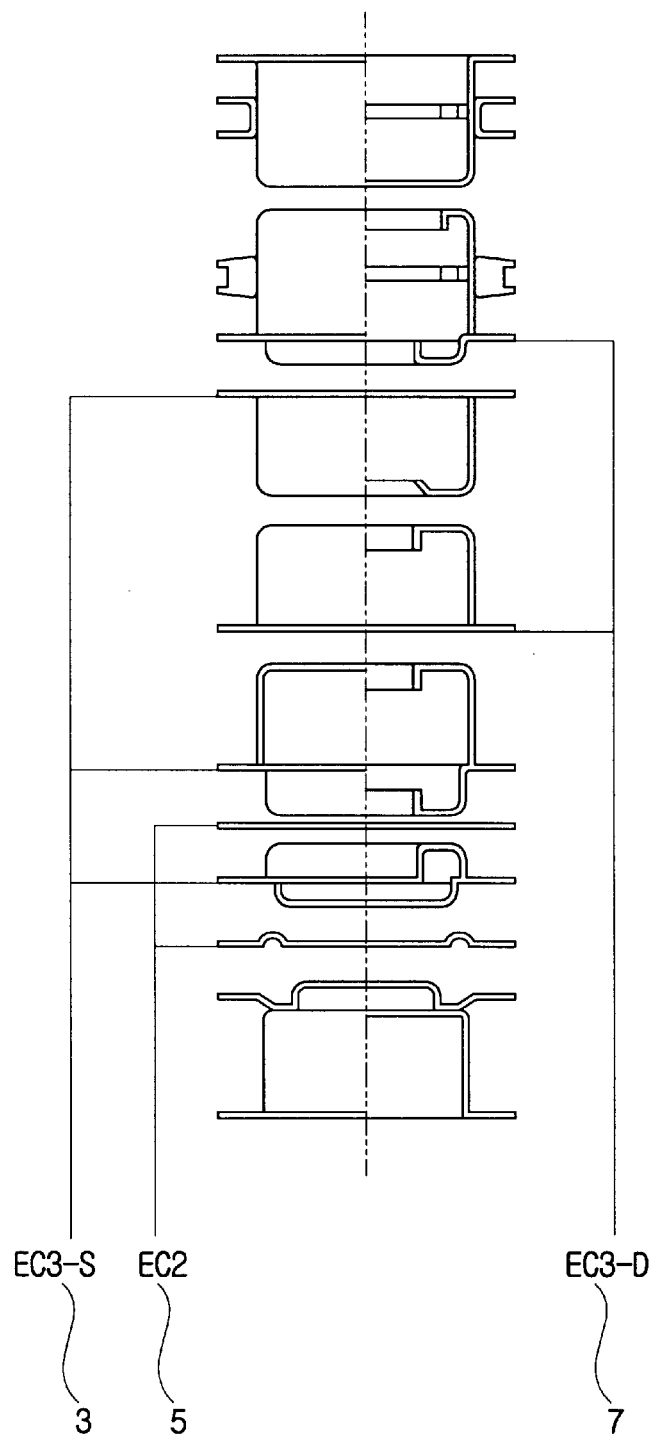
FIG. 1a is a grid arrangement diagram of a super common extended field ovallens (S-CXO) electron gun in a color display tube connected to a power-supplying apparatus, in accordance with the principles of the present invention.

Recently, a super common extended field ovallens (S-CXO) color display tube (CDT) electron gun has been developed, having an improved focus-function thereof. As illustrated in FIG. 1a, the S-CXO color display tube electron gun has more additional grids, EC3-S (G3) and EC2 (G2), comparing with another electron gun including grids, EC3-D (G4), EC3-S (G3), EC3-D (G4), EC3-S (G3) and EC2 (G2), arranged in sequence. The EC3-S and EC3-D surrounds EC2 (not shown).

Figure 1B:
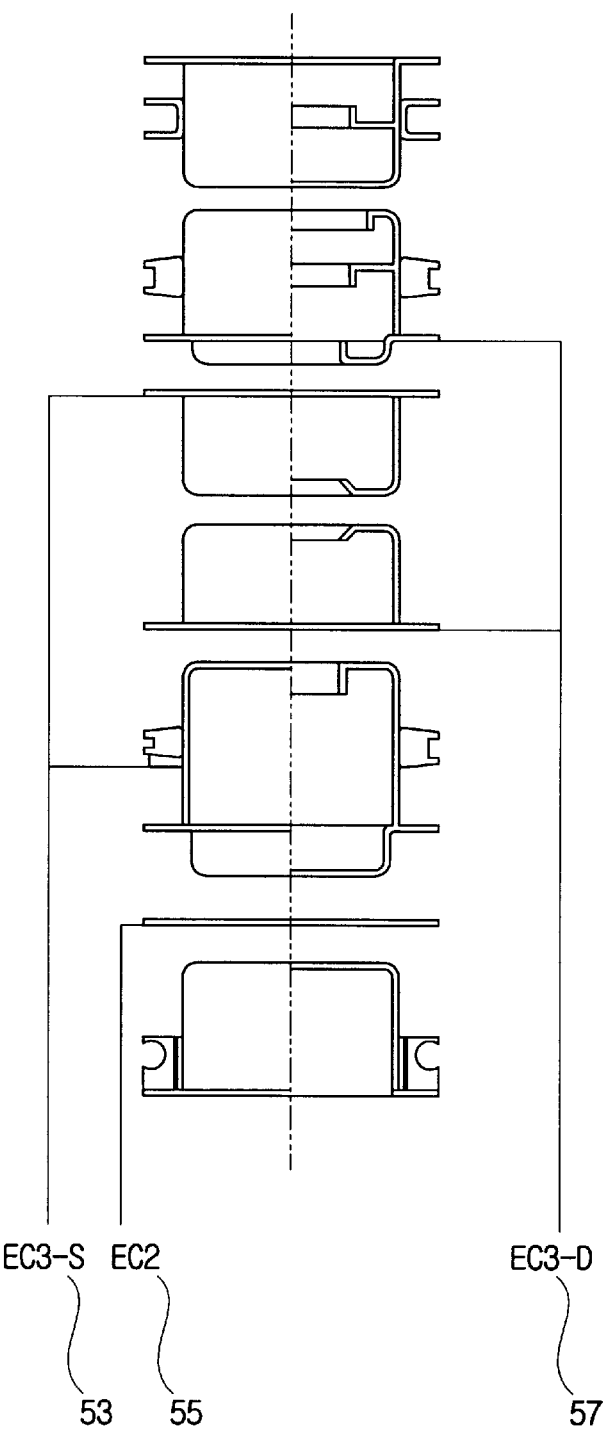
FIG. 1b is a grid arrangement diagram of a common extended field ovallens (CXO) electron gun in the color display tube.

In FIG. 1a, three status focus grids EC3-S are shown, two acceleration grids EC2 are shown, and two dynamic focus grids EC3-D are shown, in accordance with the principles of the present invention. The grid arrangement shown in FIG. 1a is advantageous over the grid arrangement shown in FIG. 1b. In FIG. 1b, two status focus grids EC3-S are shown, one acceleration grid EC2 is shown, and two dynamic focus grids EC3-D are shown.

Figure 2:
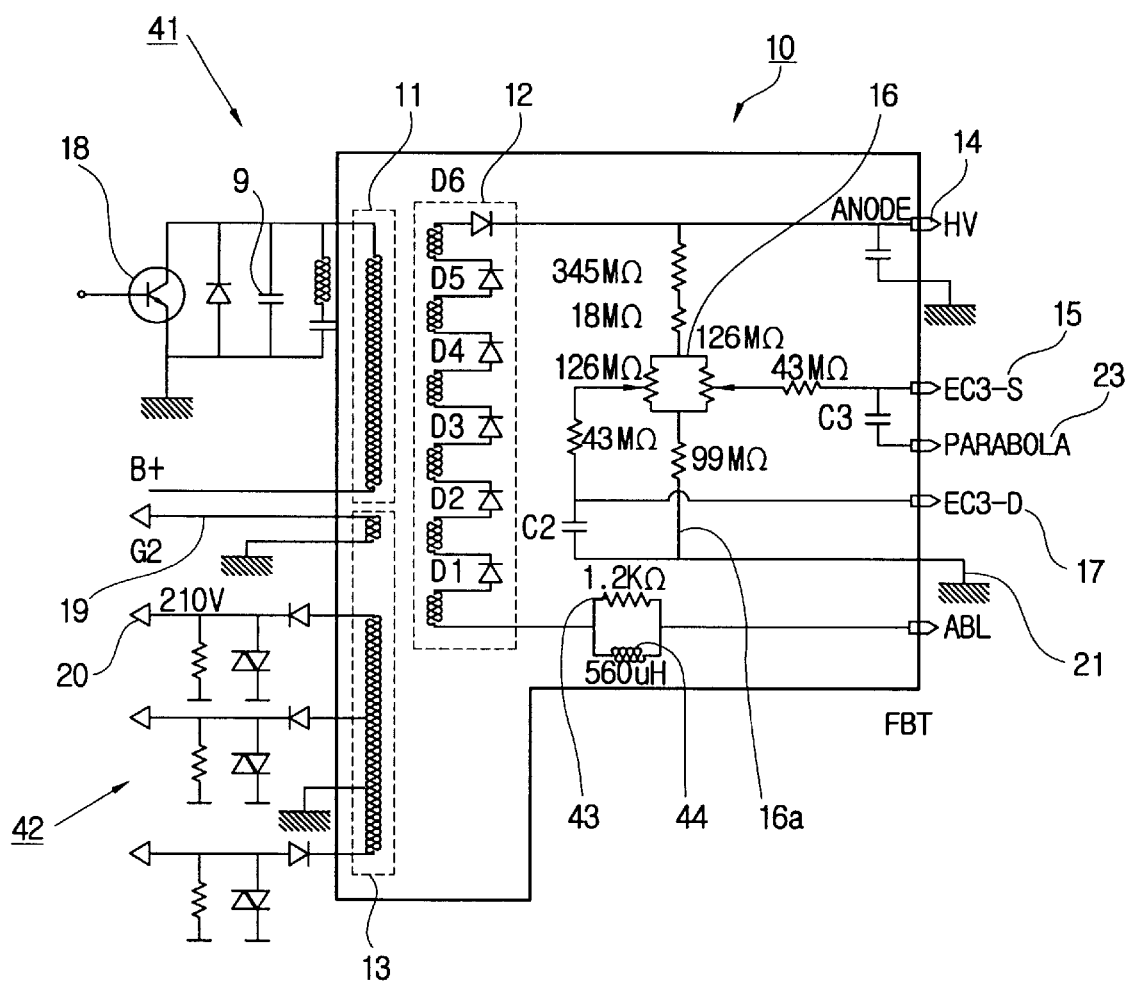
FIG. 2 is a circuit diagram of a unified high voltage deflection fly back transformer of the power-supplying apparatus, in accordance with the principles of the present invention.

FIG. 2 shows the fly back transformer (FBT) and a peripheral circuit thereof supplying high voltage to the S-CXO color display tube electron gun, in accordance with the principles of the present invention. In FIG. 2, a circuit for the fly back transformer 10 is surrounded by a bold line, a fly back transformer driving circuit 41 is arranged to the left upper part of the fly back transformer 10, and a power supplying circuit 42 supplying power from the fly back transformer 10 to an acceleration grid (G2) is arranged to the left lower part of the fly back transformer 10.

The fly back transformer driving circuit 41 applies B+ voltage to the fly back transformer 10 by an on/off switching operation of a high voltage transistor 18. If voltage is resonated by a resonance capacitor 9 according to the switching operation of the high voltage transistor 18, voltage is induced to a primary coil 11 and applied to the fly back transformer 10. Then, high voltage is induced to a secondary coil 12 of the fly back transformer 10, being opposite to the primary coil 11, by electromotive force owing to the voltage induced in the primary coil 11. The voltage induced in the secondary coil 12 is divided by a plurality of high voltage distribution resistances 16 and respectively applied to a static focus grid (G3) and a dynamic focus grid (G4) of the electron gun. The high voltage distribution resistances 16 can be high voltage distribution resistors.

High voltage is also induced to a tertiary coil 13 being opposite the secondary coil 12 by the voltage induced in the secondary coil 12. The voltage induced in the tertiary coil 13 is applied to the acceleration grid (G2) of the electron gun.

Referring to FIGS. 1a and 2, an acceleration voltage output terminal 19 and focus voltage output terminals 15 and 17 in fly back transformer 10 of FIG. 2 have high impedance, but on the other hand, high electric potentials. Thus, it is likely to make a potential drop according to a discharge owing to a change of atmospheric pressure outside the color display tube or to impurities. Further, because a focus grid 3 surrounds an acceleration grid 5, the voltage of the acceleration voltage output terminal 19 unstably fluctuates depending upon the voltage change of the focus voltage output terminals 15 and 17. Accordingly, a screen becomes dim, or an iridescent phenomenon may appear on the screen.

Referring to FIG. 1a, an S-CXO (Super Common Extended Field Ovallens) electron gun in a color display tube has grids, EC3-D 7, EC3-S 3, EC3-D 7, EC3-S 3, EC2 5, EC3-S 3, and EC2 5, arranged in sequence. The EC3-D 7 is a dynamic focus grid (G4), the EC3-S 3 is a static focus grid, and the EC2 5 is an acceleration grid (G2).

Figure 3:
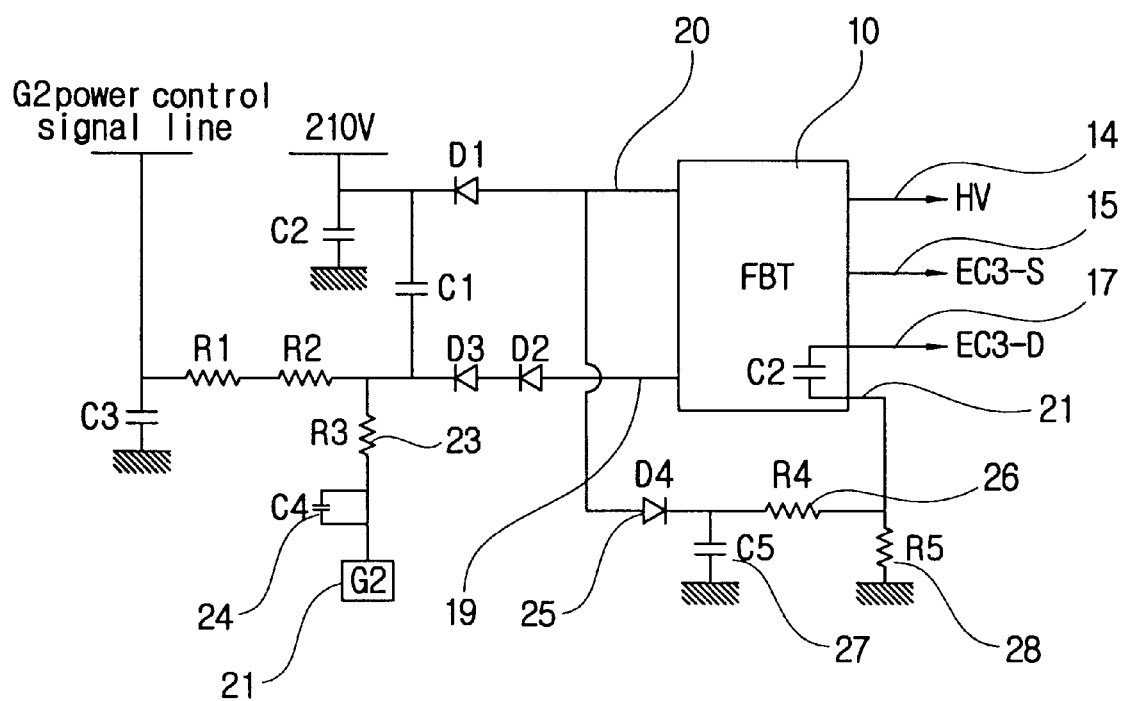
FIG. 3 is a circuit diagram for recovering the focus voltage of the power-supplying apparatus, in accordance with the principles of the present invention.

Referring to FIGS. 2 and 3, a circuit for the fly back transformer 10 boosts voltage supplied to the electron gun in the color display tube, which is surrounded by a bold line. An fly back transformer driving circuit 41 is arranged to the left upper part of the fly back transformer 10, and a power supplying circuit 42 supplying power from the fly back transformer 10 to the acceleration grid (G2) is arranged to the left lower part of the fly back transformer 10.

In the fly back transformer driving circuit 41 applies B+ voltage to the fly back transformer 10 by an on/off switching operation of a high voltage transistor 18. If voltage is resonated by a resonance capacitor 9 according to the switching operation of the high voltage transistor 18, voltage is induced to a primary coil 11 and applied to the fly back transformer 10. Then, high voltage is induced to a secondary coil 12 of the fly back transformer 10, being opposite to the primary coil 11, by electromotive force owing to the voltage induced in the primary coil 11.

The high voltage 14 induced in the secondary coil 12 of the fly back transformer 10 is divided by a plurality of high voltage distribution resistances 16 and respectively applied to a static focus grid (G3) and a dynamic focus grid (G4) of the electron gun.

High voltage is also induced to a tertiary coil 13 being opposite the secondary coil 12 by the voltage induced in the secondary coil 12. The voltage induced in the tertiary coil 13 is applied to the acceleration grid (G2) of the electron gun, passing through rectifiers D2 and D3 (FIG. 3) for rectifying high voltage and a smoother C1 smoothing the rectified high voltage pulse. Here, the voltage applied to the acceleration grid (G2) is about 540 volts.

In order to apply voltage to the focus grids G3 and G4 in the secondary coil 12 of the fly back transformer 10 of FIG. 2, the high voltage distribution resistances 16 are connected in series. The high voltage is divided by the high voltage distribution resistances 16 and applied to the respective focus grids G3 and G4. A line branched from a static focus voltage output terminal 15 outputs a parabola-type voltage for performing dynamic focusing through a capacitor C3. Below the secondary coil 12 of the fly back transformer 10, a resistance 43 and a coil 44 are connected in parallel and an ABL (Auto Bright Limiter) circuit (not shown) controlling a screen voltage by detecting the brightness of the screen is connected thereto.

In the end parts of a line 16a connected to the high voltage distribution resistances 16 and an acceleration voltage output terminal 21 of a dynamic focus voltage output terminal 17 are, as shown in FIG. 3, connected with a focus voltage detection resistance 28 in series, in accordance with the principles of the present invention. The voltage applied to the dynamic focus grid (G4) is detected by measuring the voltage applied to the focus voltage detection resistance 28. In the case that the applied voltage is normal, the voltage detected through the focus voltage detection resistance 28 is about 6 kilovolts (kV).

In FIG. 3, the line to which the focus voltage detection resistance 28 is connected, is connected to the power-supplying terminal 20 supplying vertical and dynamic waveform power to a parabola waveform output terminal 23 of the fly back transformer 10. In the line connecting the power-supplying terminal 20 and the focus voltage detection resistance 28 are provided a diode D4 having an anode connected to the focus voltage detection resistance 28, cutting an inverse electric current, and a voltage boost parts comprising a resistance 26 and a capacitor 27. Where the voltage of the focus voltage detection resistance 28 is dropped and equal to the voltage of the power-supplying terminal 20, the voltage boost part 26 and 27 boosts the voltage of the focus voltage detection resistance 28.

In the case that the electron gun in the color display tube is normally operated, because the voltage of the focus voltage detection resistance 28 is higher than the voltage of the power-supplying terminal 20, the diode 25 cuts off an electric current and the voltage boost parts 26 and 27 is charged by the voltage of the dynamic focus voltage detection resistance 28. However, if the voltage of the focus voltage output terminal 17 is dropped according to the grid discharging of the electron gun in the color display tube, the charged voltage in the voltage boost parts 26 and 27 and the voltage of the power-supplying terminal 20 of FIG. 3 allow the focus voltage output terminal 17 to be boosted, to thereby return to the normal voltage.

In FIG. 3, the end part of the acceleration voltage output terminal 21 of the fly back transformer 10 connected with the acceleration grid (G2) are connected with a resistance 23 and a by-pass capacitor 24. Because the voltage charged in the by-pass capacitor 24 maintains the acceleration voltage, the voltage of the acceleration voltage output terminal 21 is prevented from fluctuating due to the voltage change of the focus voltage output terminals 17.

With this configuration, when the voltage of the dynamic focus voltage output terminal 17 of fly back transformer 10 is dropped, the voltage charged in the integrating circuit including the resistance 26 and the capacitor 27 can recover the dropped voltage to the normal voltage, and therefore the voltage of the focus voltage output terminal 17 is maintained stably. Moreover, the voltage of the acceleration voltage output terminal is prevented from fluctuating according to the voltage change of the focus voltage output terminal owing to the acceleration grid of the electron gun in the color display tube and to the structure of the focus grid.

The above-description is made to a unified high voltage deflection power-supplying apparatus, but it can be also applied to a separated one.

In addition, in the above-described embodiment, the power supplying part is connected to the vertical and dynamic power-supplying terminal of the fly back transformer, for supplying a predetermined reference voltage, but it may be connected to a separate power-supplying apparatus.

As described above, the present invention provides the power-supplying apparatus for the electron gun in the color display tube, which can recover the voltage of the focus voltage output terminal dropped according to the grid discharging of the electron gun in the color display tube to the normal voltage.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A power supply apparatus for an electron gun in a color display tube, the apparatus comprising:
   a transformer having a focus voltage output terminal and an acceleration voltage output terminal;
   a power supplying part supplying a predetermined reference voltage;
   a focus voltage detection part detecting a focus voltage of said focus voltage output terminal; and
   a focus voltage boost part boosting said focus voltage of said focus voltage output terminal when said focus voltage detected by said focus voltage detection part is lower than said reference voltage of said power supplying part.

2. The apparatus of claim 1, said focus voltage detection part including a detection resistance connected in series to said focus voltage output terminal.

3. The apparatus of claim 1, said focus voltage boost part comprising:
   a voltage boost circuit having a resistance and a capacitor positioned between said power supplying part and said focus voltage detection part, said voltage boost circuit storing said reference voltage from said power supplying part.

4. The apparatus of claim 3, said power supplying part comprising a vertical and dynamic waveform power-supplying part of said transformer.

5. The apparatus of claim 1, said focus voltage boost part including a diode cutting off an inverse electric current from said focus voltage detection part to said power supplying part.

6. The apparatus of claim 1, said acceleration voltage output terminal being provided a by-pass capacitor maintaining an acceleration voltage.

7. A method for recovering a normal focus voltage of an electron gun in a color display tube, the method comprising:
   detecting a focus voltage applied to a focus grid of said electron gun;
   comparing said focus voltage with a predetermined reference voltage; and
   boosting said focus voltage applied to said focus grid when said focus voltage is lower than said reference voltage.

8. The method of claim 7, said reference voltage corresponding to a voltage of a vertical and dynamic waveform power-supplying terminal being applied to said focus grid.

9. The method of claim 8, said boosting comprising:

supplying a first voltage to said focus grid, said first voltage being charged by a capacitor and a resistor positioned between said focus grid and said vertical and dynamic waveform power-supplying terminal.

10. A power supply apparatus, the apparatus comprising:

a transformer having a focus voltage output terminal and an acceleration voltage output terminal, said transformer being a fly back transformer;

a power supplying part supplying a predetermined reference voltage;

a focus voltage detection part detecting a focus voltage of said focus voltage output terminal, said focus voltage detection part including at least one resistor unit connected in series to said focus voltage output terminal; and a focus voltage boost part boosting said focus voltage of said focus voltage output terminal when said focus voltage detected by said focus voltage detection part is lower than said reference voltage of said power supplying part.

11. The apparatus of claim 10, said power supplying part comprising a vertical and dynamic waveform power-supplying part of said transformer.

12. The apparatus of claim 11, said focus voltage boost part comprising a voltage boost circuit having a resistance and a capacitor positioned between said power supplying part and said focus voltage detection part, said voltage boost circuit storing said reference voltage from said power supplying part.

13. The apparatus of claim 12, said focus voltage boost part including a diode cutting off an inverse electric current from said focus voltage detection part to said power supplying part.

14. The apparatus of claim 13, said acceleration voltage output terminal being provided a by-pass capacitor maintaining an acceleration voltage.

15. A method, comprising:

detecting a focus voltage applied to a focus voltage output terminal of an electron gun;

comparing said focus voltage with a reference voltage;

boosting said focus voltage applied to said focus voltage output terminal when said focus voltage is lower than said reference voltage, said boosting including supplying a first voltage to said focus voltage output terminal; and charging said first voltage in dependence upon at least one capacitor unit electrically connected to said focus voltage output terminal.

16. The method of claim 15, said comparing being performed by a detection part including at least one resistor unit electrically connected to said focus voltage output terminal.

17. The method of claim 16, said at least one resistor unit being connected in series to said focus voltage output terminal.

18. The method of claim 17, said charging of said first voltage being performed by said at least one capacitor unit and at least one resistor unit, said at least one resistor unit being electrically connected to said focus voltage output terminal.

19. The method of claim 15, said charging of said first voltage being performed by said at least one capacitor unit and at least one resistor unit, said at least one resistor unit being electrically connected to said focus voltage output terminal.

20. The method of claim 15, said charging of said first voltage being performed by said at least one capacitor unit connected in series with at least one resistor unit.

* * * * *